United States Patent

[11] 3,570,539

| [72] | Inventor | Cecil F. Herring<br>136 Riversedge Way, Minneapolis, Minn. 55421 |
|---|---|---|
| [21] | Appl. No. | 818,035 |
| [22] | Filed | Apr. 21, 1969 |
| [45] | Patented | Mar. 16, 1971 |

[54] VALVE APPARATUS
2 Claims, 3 Drawing Figs.

[52] U.S. Cl. ................................................... 137/625.44, 137/612
[51] Int. Cl. ..................................................... F16k 11/08
[50] Field of Search ........................................... 137/625.44, 625.45, 612, 625.46, 625.47, 610

[56] References Cited
UNITED STATES PATENTS

| 1,100,091 | 6/1914 | Pennington | 137/625.46X |
| 2,856,952 | 10/1958 | Stillwagon | 137/625.46X |
| 3,040,776 | 6/1962 | Russell | 137/625.44X |
| 3,190,584 | 6/1965 | Gire et al. | 137/625.46X |
| 3,373,771 | 3/1968 | Boyen | 137/612X |

FOREIGN PATENTS

| 591,515 | 1/1960 | Canada | 137/625.46 |
| 730,023 | 3/1966 | Canada | 137/625.47 |
| 1,506,013 | 11/1967 | France | 137/610 |
| 921,239 | 12/1954 | Germany | 137/625.46 |
| 1,140,788 | 12/1962 | Germany | 137/625.44 |

Primary Examiner—M. Cary Nelson
Assistant Examiner—Michael O. Sturm
Attorney—Lew Schwartz ABSTRACT: A controllable channel having an entrance and bifurcating into a pair of exits. A movable gate within the channel has three positions in which it can block the entrance, or block either one of the exits. The gate is mounted on a rotatable shaft which is aligned with the line of bifurcation within the channel. The top of the gate is convexly curved, and the shaft is rotated to place the gate in the selected position. When the gate is positioned to block either one of the exits, a sidewall of the gate will act as a portion of the channel wall for the exit that is not blocked.

Patented March 16, 1971

3,570,539

INVENTOR.
CECIL F. HERRING

BY
Lew Schwartz
ATTORNEY

VALVE APPARATUS

BACKGROUND OF THE INVENTION

The apparatus of this invention is concerned with channel apparatus for controlling the passage of materials in a material storage system. Such material systems are well known in the art, and the apparatus of this invention is particularly adapted to material storage systems which handle grain, soybeans, and the like. As is well known to those skilled in the art, such materials as grain, soybeans, etc. will be augered down the length of a conduit for storage purposes. Along the conduit are several hoppers through which the material being augered can drop to be discharged from the hopper into a selected storage area. It is often desired that one hopper have the capability of discharging into at least two storage areas, and this is accomplished in the prior art by a trap which is placed laterally in the hopper and slid in a frame to open the hopper on one side or the other to direct the flow of materials. Further, it is desirable to be able to shut off flow through the hopper, and this is accomplished by positioning the trap to shut off the entire hopper. A disadvantage found in the prior art method is that the grain or other material tends to collect within the frame of the trap and on the trap itself, and, particularly when wet, the material will often react in a cementlike manner to cause a complete freeze of the trap, or at least to make the trap extremely difficult to operate. The apparatus of this invention is designed to provide all capabilities of the prior known devices, and to avoid the above-mentioned disadvantage. The apparatus of this invention is designed to be self-cleaning and, further, requires no separate frame and thus avoids that expense.

SUMMARY OF THE INVENTION

Briefly described, the apparatus of this invention comprises a bifurcated channel having an entrance and bifurcating into a pair of exits. A rotatable shaft is mounted in the channel along the line of bifurcation. A gate is provided having a pair of sidewalls attached to the shaft and extending in a divergent or v-shaped pattern from the shaft. The outward ends of the two sides are interconnected by a convex top plate of the gate. Preferably, the entire gate is enclosed by adding end pieces to the above-described pie-shaped structure, to prevent the materials from entering the structure. Means are provided for rotating the shaft so that the gate assumes a selected position which either blocks the entrance, or a selected one of the two exits. When one of the two exits is being blocked, the respective sidewall of the gate forms a portion of the channel wall between the entrance and the other or unblocked exit. Extending members are provided within the channel to contact the convex top both for aiding in blockage of materials and for cleaning of the convex top as it rotates against the extended member. Preferably lock means are provided for locking the gate at least in the position blocking the entrance.

DESCRIPTION OF THE PREFERRED EMBODIMENT

Figure 1:
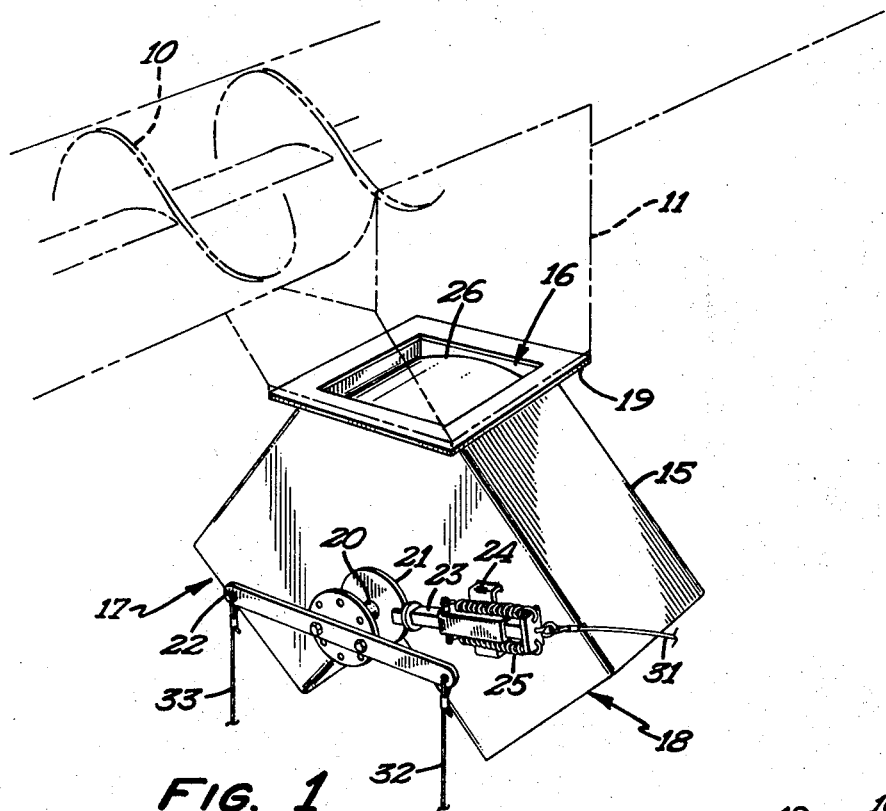
FIG. 1 is a peripheral view of the apparatus of this invention as it is attached to an augering system known in the art.

In FIG. 1 there is shown in ghost lines an auger conduit 10 and a hopper 11 which form a portion of a material-handling system well known to those skilled in the art. Rotation of the auger within conduit 10 will cause a flow of materials through conduit 10 some of which will fall into hopper 11. Also shown in FIG. 1, attached to the discharge end of hopper 11, is the apparatus of this invention comprising a valve or controllable channel 15. Channel 15 is bifurcated, having an entrance 16 and bifurcating into a pair of exits 17 and 18. A rim 19 is provided around entrance 16 for connection to hopper 11.

In FIG. 1 a shaft 20 can be seen exiting from channel 15 and having mounted thereon a notched wheel 21 and a handle 22. A bar 23 is in engagement with the notch of wheel 21 and is shown as yieldingly biased into that engagement by a pair of springs 25. Springs 25 and bar 23 are slideably mounted in a bracket structure 24 connected to the external surface of channel 15. A wire 31 is connected to bar 23 and a pair of wires 32 and 33 are shown connected to handle 22.

Figure 2:
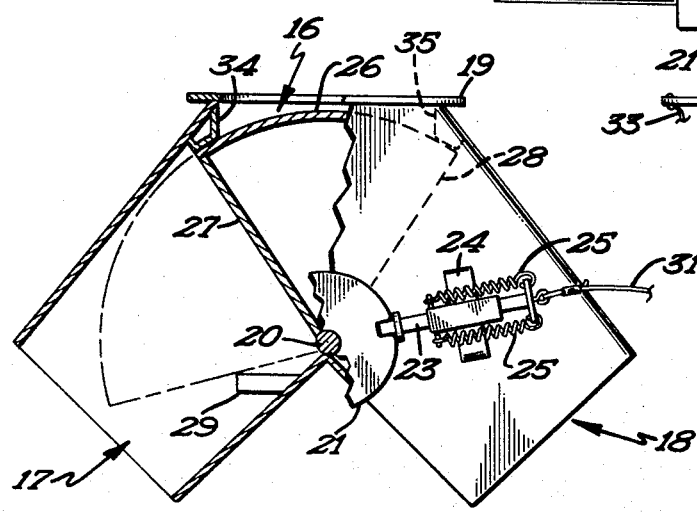
FIG. 2 is a side plane view of the apparatus of this invention with a portion in section.

Referring now to FIGS. 2 and 3, there is again shown channel 15 having entrance 16 and exits 17 and 18. In FIG. 2 it can be seen that shaft 20 is mounted inside channel 15 and extends along the line of bifurcation. A pair of sidewalls 27 and 28 are connected to shaft 20 and extend therefrom in a divergent or v-shaped pattern. A convex top 26 is connected to the outward ends of the sidewalls 27 and 28. Preferably, a pair of pie-shaped end walls are placed at the two ends of the configuration comprising walls 27 and 28 and top 26. This will cause a completely enclosed gate within channel 15, the gate being mounted to rotatable shaft 20. Preferably, the diameter of curvature of convex top 26 is the distance from shaft 20 to top 26.

A stop 29 is mounted in the channel leading to exit 17, and a similar stop (not shown) is located in the channel leading to exit 18. The stops such as 29 are provided to limit the rotation of the gate.

Also mounted within channel 15, at opposite sides of entrance 16, are a pair of extending members 34 and 35, here shown as laterally extending brackets. Members 34 and 35 are contiguous with the path of rotation of convex top 26, and extend normal to that path for the width of top 26, so that so least one of members 34 and 35 are in contact with top 26 at all times. When top 26 is in the position for blocking entrance 16 as shown in FIG. 2, both of members 34 and 35 will be in contact with top 26. As top 26 is rotated in either direction, one or the other of members 34 and 35 will remain in contact with top 26, therefore providing a scraping or cleaning process for a top 26, as well as a sealing function.

Figure 3:
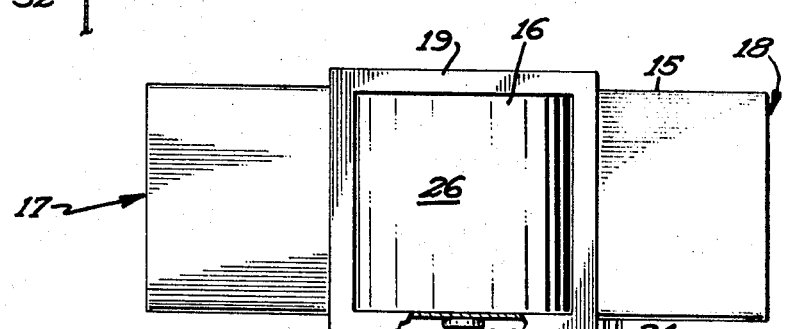
FIG. 3 is a top plane view of the apparatus of this invention.

In normal operation, assume first that it is desired that no materials be discharged from hopper 11. Therefore, the gate will be positioned such that top 26 will be as shown in FIGS. 1—3 of the drawing, blocking entrance 16 to prevent flow of materials through either of exits 17 or 18. The gate will be held in that position by lock means comprising notched wheel 21 and bar 23 yieldingly biased toward engagement with the notch in wheel 21 by springs 25. An attempt to move the gate by applying force to either of the wires 32 or 33 attached to handle 22 will not be successful due to the lock mechanism.

Assume now that it is desired to have a discharge of materials from hopper 11 through exit 18. The operator will then cause a force to pull on wire 31, which force may be manual or automatic, to pull bar 23 from engagement with the notch in wheel 21. The operator may now cause force to be exerted on the proper of wires 32 or 33 to move the gate to assume a position that blocks only exit 17. This position is shown in ghost lines in FIG. 2. When the gate has been moved to the desired position it will stop as sidewall 27 meets stop 29. Member 34 will still be in contact with convex top 26, and will have provided a scraping or cleaning action as top 26 was rotated to the position shown in ghost lines. In this position, exit 17 will still be blocked, but a flow channel will be provided between entrance 16 and exit 18, as was desired. Sidewall 28 will now form a portion of the channel between entrance 16 and exit 38.

In ordinary operation, after the desired flow of materials, the operator may place the gate back in the position shown in FIGS. 1—3 by again exerting the proper force on wires 32 or 33 and returning top 26 to contact with both of members 34 and 35 to block entrance 16. When this position is reached, the lock mechanism will automatically engage, that is, bar 23 will enter the notch of wheel 21 due to the pressure or force from springs 25.

If it is now desired to have materials pass through exit 17 to another storage area, the above process may be repeated, but the gate rotated in the opposite direction. That is, a pull is provided on wire 31 to disengage bar 23 from the notch in wheel 21, a proper force is applied to wires 32 or 33, and the gate is rotated toward exit 18 until sidewall 28 reaches the stop (not shown) in the channel leading to exit 18. Member 35 will have provided a cleaning action to top 26 during the rotation, and will remain in contact for sealing purposes when the rotation is completed. Sidewall 27 will now form a portion of the channel between entrance 16 and exit 17. Again, when the desired amount of material has passed out of exit 17, the proper force at wire 32 and 33 will rotate shaft 20 causing the gate to return to the entrance blocking position shown in FIGS. 1—3, at which time the lock mechanism described will automatically engage to hold this position.

From the above description it is apparent that the valve mechanism, or controllable channel mechanism, comprising the apparatus of this invention is a positive movement, self-cleaning apparatus providing important advantages in the handling of materials, in a novel manner.

I claim:

1. Apparatus for controlling the passage of materials or the like comprising: a bifurcated channel having an entrance and bifurcating to a pair of exits; rotatable shaft means mounted in said channel adjacent the line of bifurcation; a gate in said channel including a pair of sides each having one end connected to said shaft means and extending divergently therefrom, and including a convex top connected between the other ends of said pair of sides; means for selectively rotating said gate within said channel to a first position blocking said entrance, a second position blocking only said first exit and a third position blocking only said second exit; and a first of said sides forming a portion of a wall for the channel between said entrance and said second exit when said gate is in said second position; and a second of said sides forming a portion of another wall for the channel between said entrance and said first exit when said gate means is in said third position.

2. Apparatus for controlling the passage of materials or the like comprising: a bifurcated channel having an entrance and bifurcating to a pair of exits; rotatable shaft means mounted in said channel adjacent the line of bifurcation; a gate in said channel including a pair of sides each having one end connected to said shaft means and extending divergently therefrom, and including a convex top connected between the other ends of said pair of sides, the diameter of curvature of said convex top being substantially the distance from said shaft means to said top means for selectively rotating said gate within said channel to a first position blocking said entrance, a second position blocking only said first exit and a third position blocking only said second exit; and a pair of parallel extending members mounted in said channel adjacent opposite sides of said entrance; said members mounted contiguous to the path of rotation of said convex top and extending generally normal to said path; said members and said convex top sized so that both of said pair of members are contiguous with said convex top in said first position, and only one or the other of said pair of members is contiguous with said convex top in said second and third positions.